June 13, 1933.   B. J. UKROPINA   1,913,777
CONCRETE PIPE JOINT
Filed Dec. 1, 1930
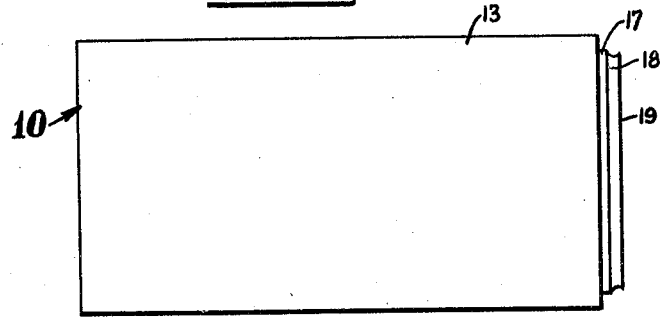
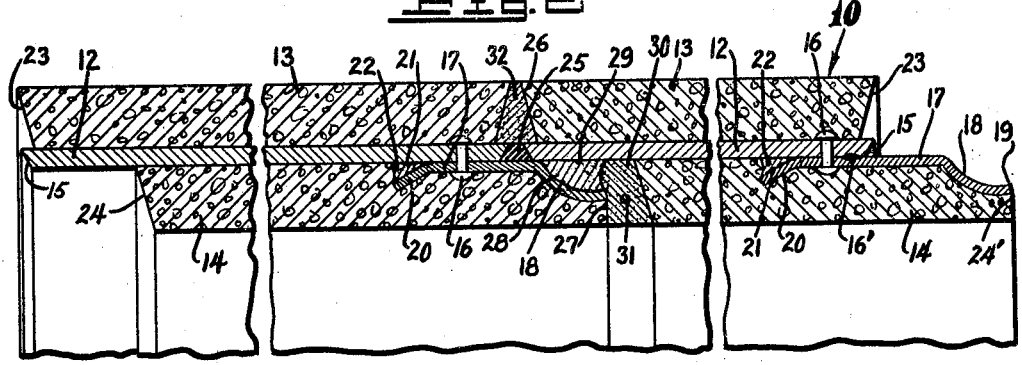
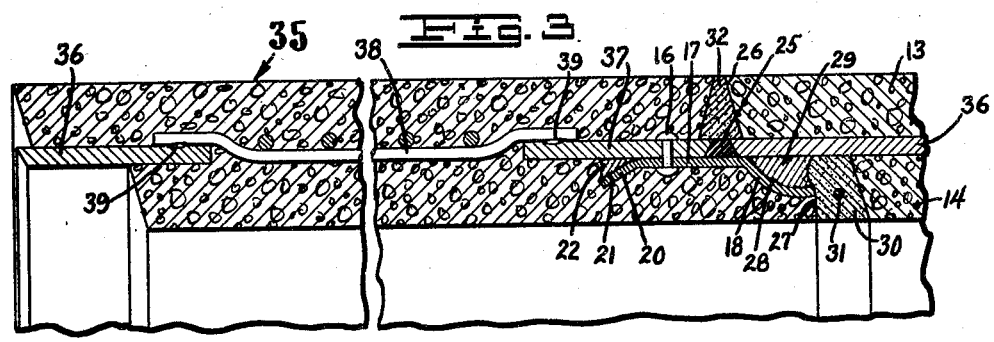
INVENTOR.
B. J. UKROPINA.
BY
ATTORNEY.

Patented June 13, 1933

1,913,777

UNITED STATES PATENT OFFICE

BOZIDAR J. UKROPINA, OF LOS ANGELES, CALIFORNIA

CONCRETE PIPE JOINT

Application filed December 1, 1930. Serial No. 499,231.

This invention relates to improvements in concrete pipes.

The general object of the invention is to provide an improved joint for concrete pipes.

Another object of the invention is to provide a concrete pipe joint wherein impervious members are embedded in the pipe and wherein a novel fluid tight joint is made between the members which are embedded in the concrete.

Other objects and advantages of this invention will be apparent from the following description taken in connection with the accompanying drawing wherein:

Fig. 1 is a side elevation of a concrete pipe embodying the features of my invention.

Fig. 2 is an enlarged fragmentary section through two sections of pipe showing my improved joint construction, and Fig. 3 is an enlarged fragmentary section through a modified form of pipe.

Referring to the drawing by reference characters I have indicated a length of concrete pipe embodying the features of my invention generally at 10. As shown the pipe includes a metal reinforcing tube 12 embedded between an outer layer of concrete 13 and an inner layer of concrete 14. Each end of the tube 12 is beveled as at 15 and secured in fluid tight relation adjacent one end of the tube to the inner surface thereof by rivets 16 I provide a metal spigot ring 17. Instead of the rivets 16 I may spot weld the parts as at 16'.

This spigot ring 17 extends beyond the end of the tube 12 where it is provided with an inwardly bowed, arcuate shoulder 18. The axis of the radius of the arc of the shoulder 18 is set in from the outer end of the spigot ring so that the end flares slightly outward as at 19. The opposite or inner end of the spigot ring 17 is inclined inwardly as indicated at 20 to provide a wedge-shaped chamber 21 in which packing material 22 is positioned. The packing material 22 which may be of rubber or asphaltum is positioned in the chamber 21 before the metal tube 12 is embedded in the concrete and when the inner layer of concrete 14 is moulded in position the concrete wedges the packing 22 tightly in the chamber 21 thereby forming a fluid tight seal between the tube 12 and the spigot ring 17.

The outer layer of concrete 13 is inwardly beveled at each end as indicated at 23 and the inner layer of concrete 14 at the end opposite the spigot ring is set back to form a bell and similarly beveled as indicated at 24, while the end adjacent the spigot ring is straight and terminates flush with the outer end of the spigot ring as at 24'.

When two lengths of pipe 10 are joined, a resilient packing ring 25 such as rubber is positioned over the spigot ring 17 adjacent the beveled end 15 of the tube 12. The ring 25 is preferably triangular or polygonal with sloping sides. The spigot end of the one pipe is then inserted in the bell end of the adjoining pipe so that the projecting portion of the spigot ring 17 is positioned inside of the tube 12 and the two pipe lengths are forced together until the resilient packing ring 25 is compressed between the adjacent ends of the tubes 12.

When the pipe lengths are in this position a chamber 26 is formed between the adjacent ends of the outer layers of concrete 13 and a chamber 27 is formed between the adjacent ends of the inner layers 14 of concrete and another chamber 28 is formed between the inner surface of the tube 12 and the outer surface of the groove 18 of the spigot ring 17. A calking material 29 which may be lead is then driven into the chamber 28 and tightly packed therein to form a fluid tight seal between the spigot ring 17 and the tube 12.

After the calking is positioned in the chamber 28 the chamber 27 is filled with a plastic material 30 such as asphaltum which may have a reinforcing member 31 embedded therein and the chamber 26 is filled with a plastic material 30 which may also be asphaltum.

In Fig. 3 I have shown a section of concrete pipe 35 embodying the features of my invention which is constructed similar to the pipe 10 except that the metal tube 12 instead of continuing the full length of the pipe comprises two end sections 36 and 37 connected by a wire reinforcing cage 38 which may be secured to the end sections by welding as at 39.

Lengths of the pipe 35 are assembled in the same manner as described in connection with the pipe 10.

It will be noted that my joint allows for contraction and expansion without liability of leakage so that concrete pipe embodying the features of my invention may be used for many purposes, and from the foregoing description it will be apparent that I have provided an improved concrete pipe and pipe joint which is simple in construction and highly efficient in use.

Having thus described my invention, I claim:

1. A concrete pipe, said pipe including a metal reinforcing member embedded between an outer layer of moulded material and an inner layer of moulded material, a spigot ring secured adjacent one end of said reinforcing member to one surface thereof, said spigot ring being of uniform thickness throughout and extending beyond the end of said member, said extended portion including an inwardly directed portion adapted to form a chamber in conjunction with an adjacent metal member, means adjacent the opposite end of said spigot ring to form a fluid tight seal between the inside of said tube and said ring, the end of said inner layer of moulded material opposite said spigot ring being set back from the end of said reinforcing member to form a bell end, said set back providing a recess whereby said seal can be tamped in place.

2. In a fluid conduit comprising a plurality of lengths of pipes, each of said pipes including a reinforcing tube exposed at both ends with the exposed ends of said tube inwardly beveled, said reinforcing tube being embedded between an outer layer of moulded material and an inner layer of moulded material, a spigot ring secured adjacent one end of each of said tubes and extending therebeyond, the outer portions of said rings including an annular outwardly opening groove and a reduced end portion, means adjacent the inner ends of said rings to form a fluid tight seal between said rings and said tubes to which they are secured, said spigot ring of one pipe section being positioned within the reinforcing tube of the adjacent pipe length at the end opposite the spigot ring, a resilient packing member surrounding each of said spigot rings, said packing members having normally inclined faces engaged by the adjacent ends of said tubes of adjacent pipe lengths and compressed therebetween, the adjacent ends of said outer layers of moulded material forming a tapered chamber at each joint and the adjacent ends of said inner layers of moulded material forming a chamber at each joint, said grooves in said spigot rings forming a chamber between the inner surface of said tube of the adjoining pipe length, calking material in said last chambers to form a fluid tight seal between said spigot rings and said tubes, said first and second chambers being filled with a plastic material and a reinforcing member in said plastic material in said second chambers.

3. In a fluid conduit, a plurality of lengths of pipe, each of said lengths of pipe including an inner layer of concrete and an outer layer of concrete, a reinforcing member embedded between said inner and said outer layer, said reinforcing member including cylindrical portions at each end of each of said lengths, said cylindrical portions in adjoining lengths being of uniform diameter, said inner layer of concrete at one end being set back to expose a portion of the inner surface of one of said cylindrical members, said inner layer of concrete at the end opposite to said set back portion being extended to form a spigot end, a spigot ring surrounding said extended spigot portion and including a portion embedded within said inner layer of concrete and firmly secured to the inner surface of its associated cylindrical reinforcement, said spigot ring having an exposed cylindrical portion of substantially the same diameter as the inside diameter of said cylindrical reinforcing member at the bell end, said spigot member having a reduced portion in advance of its cylindrical portion said reduced portion forming a chamber in conjunction with the inner surface of the adjoining bell member, calking material in said chamber, there being a circumferential groove between the end of each bell and the adjoining spigot and a plastic filling in said groove.

In testimony whereof, I hereunto affix my signature.

BOZIDAR J. UKROPINA.